US012731159B2

(12) United States Patent
Sweeney et al.

(10) Patent No.: US 12,731,159 B2
(45) Date of Patent: Sep. 8, 2026

(54) METHODS AND SYSTEMS FOR SENSOR BASED PREDICTIONS

(71) Applicant: Arizona Game and Fish Department, Phoenix, AZ (US)

(72) Inventors: Francis M. Sweeney, Scottsdale, AZ (US); Douglas W. Cummings, Cave Creek, AZ (US)

(73) Assignee: Arizona Game and Fish Department, Phoenix, AZ (US)

( * ) Notice: Subject to any disclaimer, the term of this patent is extended or adjusted under 35 U.S.C. 154(b) by 264 days.

(21) Appl. No.: 17/025,795

(22) Filed: Sep. 18, 2020

(65) Prior Publication Data

US 2021/0081959 A1 Mar. 18, 2021

Related U.S. Application Data

(60) Provisional application No. 62/902,176, filed on Sep. 18, 2019.

(51) Int. Cl.

| | |
|---|---|
| ***G01W 1/14*** | (2006.01) |
| ***G01K 13/00*** | (2021.01) |
| ***G01P 13/00*** | (2006.01) |
| ***G01V 1/00*** | (2024.01) |
| ***G01W 1/12*** | (2006.01) |
| ***G06N 20/00*** | (2019.01) |
| ***G06Q 30/018*** | (2023.01) |
| ***G06Q 50/02*** | (2024.01) |

(52) U.S. Cl.

CPC ........... *G06Q 30/018* (2013.01); *G01K 13/00* (2013.01); *G01P 13/00* (2013.01); *G01V 1/001* (2013.01); *G01W 1/12* (2013.01); *G01W 1/14* (2013.01); *G06Q 50/02* (2013.01)

(58) Field of Classification Search

CPC ...... G06Q 30/018; G06Q 50/02; G01K 13/00; G01P 13/00; G01V 1/001; G01W 1/12; G01W 1/14; A01K 29/005

See application file for complete search history.

(56) References Cited

U.S. PATENT DOCUMENTS

| | | | | |
|---|---|---|---|---|
| 8,677,941 B2 * | 3/2014 | Yanai | A61F 7/00 119/174 |
| 9,298,978 B1 * | 3/2016 | Hlatky | G06Q 50/02 |
| 2006/0085232 A1 * | 4/2006 | Rice | G06Q 10/02 705/5 |

(Continued)

FOREIGN PATENT DOCUMENTS

KR 20200084948 A * 7/2020

OTHER PUBLICATIONS

B. Lane, "Hunters like skewness, not risk: evidence of gambling behaviors in the Alaska hunting permit lottery" Published May 2018, by University of Alaska Fairbanks, <http://hdl.handle.net/11122/8729> (Year: 2018).*

(Continued)

*Primary Examiner* — Wenren Chen
(74) *Attorney, Agent, or Firm* — Ballard Spahr LLP

(57) ABSTRACT

Methods and systems are described for making sensor based predictions. A predicted population for a species can be determined. The predicted population for the species can be determined based on habitat data and wildlife data received by sensors.

21 Claims, 8 Drawing Sheets

(56) References Cited

U.S. PATENT DOCUMENTS

| | | | | |
|---|---|---|---|---|
| 2007/0033010 A1* | 2/2007 | Jones | ..................... | A01K 29/00 704/201 |

OTHER PUBLICATIONS

"New Jersey Fish and Wildlife Digest, A Summary of Rules and Management Information: 2005 Hunting Issue, vol. 19, No. 1," Aug. 1, 2005, by New Jersey Department of Environmental Protection (NJDEP), Division of Fish and Wildlife, Rutgers University Libraries; <https://doi.org/doi:10.7282/T3QR4XWJ> (Year: 2005).*

Baratchi M, Meratnia N, Havinga PJ, Skidmore AK, Toxopeus BA. Sensing solutions for collecting spatio-temporal data for wildlife monitoring applications: a review. Sensors (Basel). May 10, 2013;13(5):6054-88. doi: 10.3390/s130506054. PMID: 23666132; PMCID: PMC3690045. (Year: 2013).*

* cited by examiner

USER DEVICE 202

COMMUNICATION ELEMENT 206

CAPTURE ELEMENT 208

ADDRESS ELEMENT 210

DEVICE IDENTIFIER 212

SENSOR 205

DEVICE IDENTIFIER 228

STORAGE MEANS 207

COMMUNICATION ELEMENT 209

NETWORK 203

COMPUTING DEVICE 204

COMMUNICATION ELEMENT 214

DEVICE IDENTIFIER 216

DATABASE 218

HABITAT DATA 220

WILDLIFE DATA 222

SPORTSMAN DATA 224

LICENSE DATA 226

PREDICTION MODULE 230

300

HABITAT PROFILE 350
VEGETATION 302
ANIMAL SPECIES 304
PREDATOR 306
PRECIPITATION 308
TOPOGRAPHY 310
HUMAN IMPACT 312
PREY 307

WILDLIFE PROFILE 360
SPECIES 314
POPULATION 316
HABITAT 318
LOCATION 320
DIET 322
PREDATOR 324
SPORTING HISTORY 326
PREY 325

SPORTSMAN PROFILE 370
DEMOGRAPHIC 328
LICENSE HISTORY 330
SPORTING HISTORY 332
CONSERVATION EFFORTS 334
DONATION 336
MISCELLANEOUS 338

710
DETERMINE A PREDICTED POPULATION OF A SPECIES FOR A PLURALITY OF SECTIONS OF A ZONE

720
DETERMINE A SPORTING RECOMMENDATION FOR EACH SECTION OF THE PLURALITY OF SECTIONS

730
DETERMINE A QUANTITY OF SPORTING LICENSES TO BE ISSUED

740
DETERMINE A PRIORITIZED LIST OF A PLURALITY OF SPORTSMEN FOR ISSUING THE QUANTITY OF SPORTING LICENSES

750
ISSUE THE QUANTITY OF SPORTING LICENSES

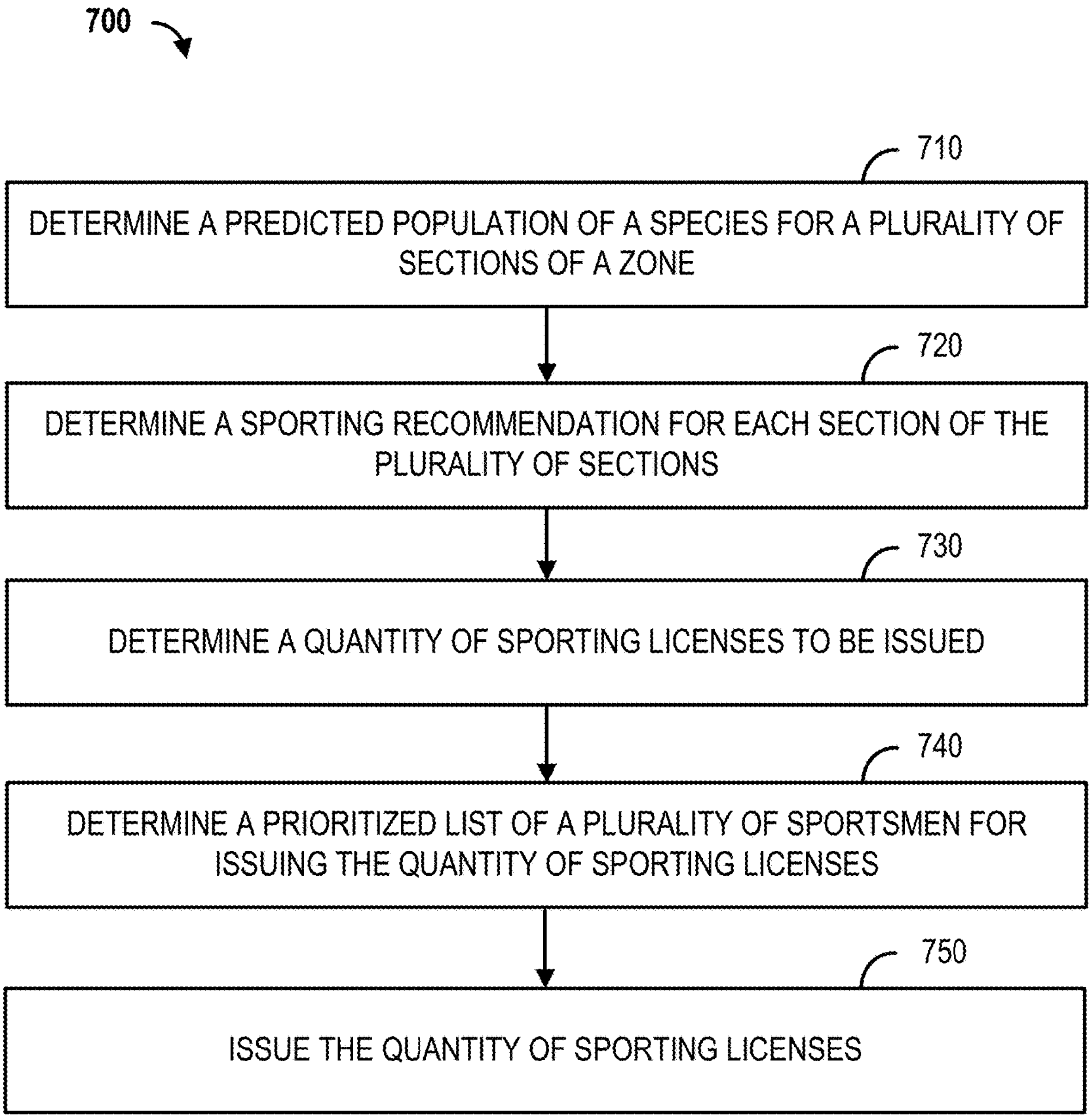

FIG. 7

METHODS AND SYSTEMS FOR SENSOR BASED PREDICTIONS

CROSS-REFERENCE TO RELATED APPLICATION

This application claims the benefit of U.S. Application No. 62/902,176 filed Sep. 18, 2019 which is hereby incorporated by reference in its entirety.

BACKGROUND

Organizations tasked with conserving natural resources, such as state wildlife agencies, state parks, national parks, game preserves, and zoos, are tasked with the conservation of both land and animals. One way to accomplish conservation is by issuing documentation (e.g., a license, a tag, etc.) for sportsman to fish or hunt species of animals and to allow harvest for consumptive use. The goal of conservation can be thwarted by harvesting too many animals, which reduces the population of the species. Conversely, harvesting too few animals may result in populations exceeding carrying capacity, causing a crash in the population of the species. Thus, there is a need for methods and systems that more accurately determine an optimal quantity of wildlife to be harvested to ensure the health of animal populations and their habitats, while optimizing conservation income for agencies. These and other shortcomings are addressed by the methods and systems described herein.

SUMMARY

It is to be understood that both the following general description and the following detailed description are exemplary and explanatory only and are not restrictive. Provided are systems and methods for sensor based predictions.

In one embodiment, a method comprises determining, based on habitat data and wildlife data, a predicted population of a species for a plurality of sections of a zone. The method can further comprise determining, based on the predicted population of the species for each section of the plurality of sections, a sporting recommendation for the zone. The sporting recommendation can indicate a portion of the predicted population of the species that can be consumed for sport within the zone to optimize conservation of the species (e.g., an optimal quantity of animals to be harvested). The method can also comprise determining, based on the sporting recommendation, a quantity of sporting licenses to be issued. The quantity of sporting licenses to be issued can correspond to the optimal quantity of animals to be harvested (e.g., an optimal quantity of sporting licenses to be issued). Further, the method can comprise determining, based on data associated with a plurality of sportsmen, a prioritized list of the plurality of sportsmen for issuing the quantity of sporting licenses. Additionally, the method can comprise issuing, based on the prioritized list, the quantity of sporting licenses.

In another embodiment, an apparatus comprises one or more processors and a memory storing processor-executable instructions. The processor-executable instructions, when executed by the one or more processors, cause the apparatus to determine, based on habitat data and wildlife data, a predicted population of a species for a plurality of sections of a zone. The instructions can further cause the apparatus to determine, based on the predicted population of the species for each section of the plurality of sections, a sporting recommendation for the zone. The sporting recommendation can indicate a portion of the predicted population of the species that can be consumed for sport within the zone to optimize conservation of the species (e.g., the optimal quantity of animals to be harvested). The instructions can also cause the apparatus to determine, based on the sporting recommendation, a quantity of sporting licenses to be issued. The quantity of sporting licenses to be issued can correspond to the optimal quantity of animals to be harvested (e.g., an optimal quantity of sporting licenses to be issued). Further, the instructions can cause the apparatus to determine, based on data associated with a plurality of sportsmen, a prioritized list of the plurality of sportsmen for issuing the quantity of sporting licenses. Additionally, the instructions can cause the apparatus to issue, based on the prioritized list, the quantity of sporting licenses.

In an additional embodiment, one or more non-transitory computer readable media can store processor-executable instructions. The processor-executable instructions, when executed by at least one processor, can cause determining, based on habitat data and wildlife data, a predicted population of a species for a plurality of sections of a zone. The processor-executable instructions can further cause determining, based on the predicted population of the species for each section of the plurality of sections, a sporting recommendation for the zone. The sporting recommendation can indicate a portion of the predicted population of the species that can be consumed for sport within the zone to optimize conservation of the species (e.g., the optimal quantity of animals to be harvested). The processor-executable instructions can also cause determining, based on the sporting recommendation, a quantity of sporting licenses to be issued. The quantity of sporting licenses to be issued can correspond to the optimal quantity of animals to be harvested (e.g., an optimal quantity of sporting licenses to be issued). Further, the processor-executable instructions can cause determining, based on data associated with a plurality of sportsmen, a prioritized list of the plurality of sportsmen for issuing the quantity of sporting licenses. Additionally, the processor-executable instructions can cause issuing, based on the prioritized list, the quantity of sporting licenses.

Additional advantages will be set forth in part in the description which follows or can be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems:

FIG. 7 is a flowchart of an example method; and

DETAILED DESCRIPTION

Figure 1:
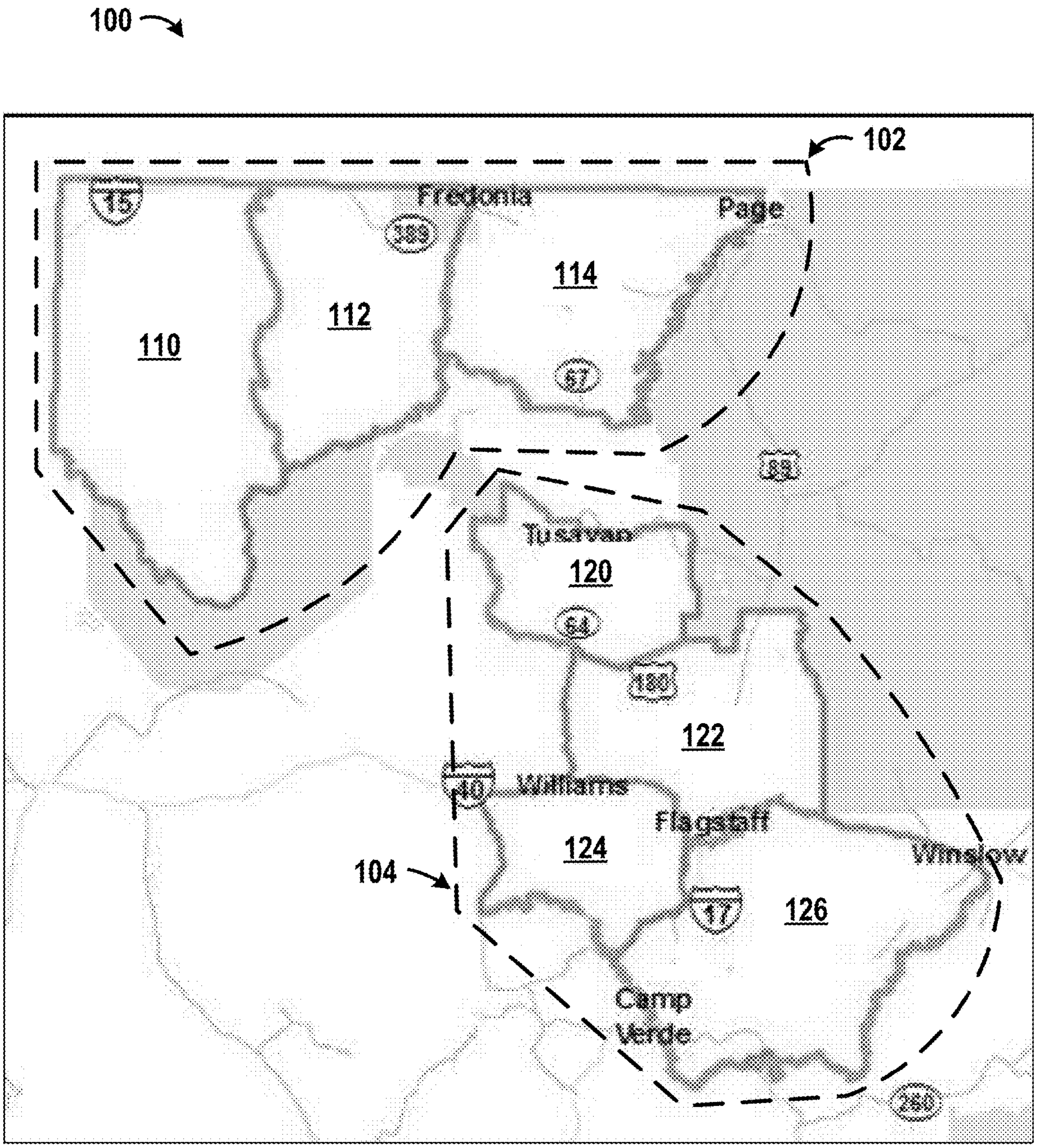
FIG. 1 is a diagram illustrating exemplary zones.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and examples where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Described herein are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all examples of this application including, but not limited to, steps in described methods. Thus, if there are a variety of additional steps that may be performed it is understood that each of these additional steps may be performed with any specific example or combination of examples of the described methods.

The present methods and systems may be understood more readily by reference to the following detailed description of preferred examples and the examples included therein and to the Figures and their previous and following description.

As will be appreciated by one skilled in the art, the methods and systems may take the form of an entirely hardware example, an entirely software example, or an example combining software and hardware example. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Note that in various examples this detailed disclosure may refer to a given entity performing some action. It should be understood that this language may in some cases mean that a system (e.g., a computer) owned and/or controlled by the given entity is actually performing the action.

FIG. 1 shows an example of a diagram 100. As shown, the diagram 100 comprises a portion of a map. For example, the diagram 100 can be a hunting diagram that indicates a plurality of zones (e.g., a first zone 102 and a second zone 104) where one or more species of animals may be harvested (e.g., the removal of one member of the species). The zones 102, 104 can be defined based on any information such as cities, counties, habitat, natural landmarks, private land, public land, and so forth. For example, the zones 102, 104 can be defined based on the habitat for a specific species of animal. As an example, the specific species of animal can be a pronghorn that is only found in mountainous regions. Accordingly, the zones 102, 104 can designate the regions, areas, etc. where the pronghorn can be found. Stated differently, the zones 102, 104 can designate the areas where the habitat is sufficiently capable of supporting pronghorns. As another example, the zones 102, 104 can be defined based on geographic boundaries or manmade boundaries (e.g., city borders, county borders, state borders, etc.). For example, the zone 102 can be defined based on a first county, and the second zone 104 can be defined based on a second county. As another example, the zones 102, 104 can be defined based on the status of the land. For example, the zone 102 can be a public hunting zone (e.g., a designated hunting zone on public land), whereas the zone 104 can be a private hunting zone (e.g., a designated hunting zone on private land). However, hunting licenses for both zones 102, 104 may be issued by a state entity even though the zone 104 is located on private land.

Each of the zones 102, 104 can comprise a plurality of sections. Specifically, the zone 102 comprises section 110, section 112, and section 114; and the zone 104 comprises section 120, section 122, section 124, and section 126. The sections can be defined based on any information, similar to the zones 102, 104 as explained above. The plurality of sections can be utilized to more accurately determine one or more characteristics of the zones 102, 104 due to the smaller foot print of each of the sections as compared to the zones 102, 104.

One or more characteristics can be determined for each of the plurality of sections of the zones 102, 104. For example, data can be collected in each of the sections that indicate habitat data for a section, as well as wildlife data for a section. As an example, the habitat data (e.g., habitat characteristics such as data related to weather, flora, fauna, etc.) for each section can comprise vegetation, animal species, predator, precipitation, topography, human impact, and so forth. The habitat data may be determined dynamically, for example by one or more sensors. For example, the one or more sensors may send and receive data. For example, the one or more sensors may send the habitat data to a computing device. For example, the one or more sensors may receive data from the computing device. For example, the computing device may send an instruction to a sensor of the one or more sensors to power on a component (e.g., a thermometer) or power down a component (e.g., the thermometer). The one or more sensors may comprise a temperature sensor, a moisture sensor, a humidity sensor, a light sensor, a camera, a motion sensor, a pressure sensor, a vibration sensor, an audio sensor a radio-frequency identification device (RFID) sensor, a GPS tacking device, combinations thereof, and the like. The one or more sensors may record the habitat data and store the habitat data in as historical habitat data. The historical habitat data may be used to train a machine learning model as described further herein.

For example, the temperature sensor may, over the course of time (e.g., over the course of one or more years and/or one or more hunting or sporting seasons) record the temperature of a given zone (e.g., the first zone 102 and/or the second zone 104) of the plurality of zones. The temperature sensor may send the recorded temperatures to the computing device to be stored as historical habitat data as described further herein. The computing device may use the historical habitat data to train a machine learning model as described further herein.

Likewise, the precipitation sensor may, over the course of time (e.g., over the course of one or more years and/or one or more hunting or sporting seasons), determine and record rainfall in a given zone (e.g., the first zone 102 and/or the second zone 104) of the plurality of zones. This data may be sent to the computing device and stored as historical habitat data (e.g., historical precipitation data). The historical precipitation data may be used to train a machine learning model as described further herein.

In a similar fashion, the light sensor may, over the course of time (e.g., over the course of one or more years and/or one or more hunting or sporting season), determine and record days of sunlight in a given zone (e.g., the first zone 102 and/or the second zone 104) of the plurality of zones during a time period as light data. The light sensor may send the light data to the computing device. The light data may be stored as historical habitat data. The historical habitat data may be used to train a machine learning model as described further herein.

The wildlife data (e.g., wildlife characteristics such as data related to animal behavior, species population, etc) for each section may comprise specific information for each species that is located within the section. For example, data may be collected for each species that indicates the population of the species, the habitat of the species, the location of the species, the diet of the species, predator of the species, the sporting history (e.g., a history of how many licenses have been issued for the species, the number of animals of the species that have been previously harvested, etc.), and so forth.

The wildlife data may be determined by the one or more sensors. The wildlife data determined by the one or more sensors may be stored as historical wildlife data. The historical wildlife data may be input to a machine learning model as described further herein to determine an optimal quantity of sporting licenses to be determined.

For example, a camera may capture an image of an animal (e.g., the pronghorn). The camera may store the image in storage. The camera may send the image to the computing device. The computing device may be configured to process the image. For example, the computing device may use object recognition or other known techniques to determine a species associated with the animal. Based on determining the species associated with the animal, the computing device may determine the presence of the animal. As such, the computing device may determine and/or update species data as described further herein.

For example, a motion sensor may be triggered by an animal and the RFID sensor may determine that a "tagged" animal has passed by the motion sensor. The tagged animal may be associated with an identifier stored in a database and/or input to a machine learning model as described further herein. The aforementioned examples are not meant to be limiting and it is to be understand any type of sensor may be implemented.

For example, an audio sensor may receive an audio input (e.g., the "hoot" of an owl or the mating call of an elk). The audio sensor may relay the audio input to the computing device. The computing device may determine (for example, by way of machine learning or artificial intelligence) that the audio input is, in fact, the "hoot" of the owl or the mating call of the elk. Based on determining the source of the audio input (e.g., the owl or the elk), the computing device may determine the presence of the animal that created the audio input. As such, the computing device may determine and/or update species data as described further herein.

For example, a vibration sensor may receive a vibration input. The vibration sensor may relay the vibration input to the computing device. The computing device may determine (for example, by way of machine learning or artificial intelligence), that the specific amplitude and frequency of the vibration input is indicative of a species and/or a quantity of animals of the species. For example, the computing device may reference historical wildlife data to determine a footfall frequency and amplitude associated with a single walking elk and, based on the vibration input, determine that the received vibration input is indicative of a herd of three walking elk. Based on determining the source of the vibration input (e.g., the herd of three walking elk) the computing device may determine the presence of the animal that created the audio input. As such, the computing device may determine and/or update species data as described further herein.

The aforementioned examples are not meant to be limiting and it is to be understood that any relevant wildlife data and or habitat data may be determined and stored as historical wildlife data and habitat data. Further, the historical wildlife data and historical habitat data may be used in conjunction with historical sportsman data to train the machine learning classifier as described further herein. For example, the machine learning classifier may be trained to determine based on historical wildlife data, historical habitat data, and historical sportsman data, one or more machine learning models. The one or more machine learning models may generate, based on the historical wildlife data, historical habitat data, and historical sportsman data, a predicted population (e.g., a number of animals of one or more species). Based on the predicted population, the one or more machine learning models may determine an optimal quantity of sporting licenses to be issued as described further herein.

The one or more characteristics for each of the plurality of sections can be determined. The one or more characteristics for each of the plurality of sections can be determined based on data captured by a user device (e.g., the user device 202 of FIG. 2). For example, a user of the user device can utilize the user device to record the one or more characteristics for each of the plurality of sections. The user can use the user device to record data related to the one or more characteristics for each of the plurality of sections. For example, the wildlife data may be determined via user inputs. For example, a sportsman may discover animal droppings, discern the contents of the droppings and thereby discern the diet of the animal. Such information may be communicated to the computing device for storage and processing. As another example, one or more sensors (e.g., the sensor 205 of FIG. 2) can be utilized to capture the one or more characteristics for each of the plurality of sections. The one or more sensors can be configured to capture the one or more characteristics either manually or automatically. For example, the one or more sensors can be precipitation sensors that automatically detect and measure rainfall.

The plurality of sections of each of the zones 102, 104 can be utilized to monitor the health of a species. The plurality of sections of each of the zones 102, 104 can provide a more accurate measure of the health of the species due to the smaller foot print of each of the sections. For example, the suitability of the habitat within the zones 102, 104 can vary greatly from section to section. As an example, the section 110 can be a poor habitat for a species of animal, the section 112 can be a moderate habitat for the species of animal, and the section 114 can be a perfect habitat for the species of animal. Thus, the zone 102 can overall be a moderate habitat for the species of the animal (e.g., the average habitat for the zone 102 is moderate). However, the section 110 can support only a small portion of the species. Thus, by using the sections instead of the zones, a more accurate picture of the health of the species can be determined.

The one or more characteristics for each of the plurality of sections can be utilized to determine the health of a species. For example, the one or more characteristics for each of the plurality of sections can be utilized to determine a predicted population for the species at a future point in time. The predicted population can predict the population for any period of time such as 1 month, 6 months, 1 year, 5 years, 10 years, and so forth. The predicted population of the species can be based on one or more characteristics and/or factors to determine the predicted population. For example, the predicted population can take into account data of the habitat (e.g., vegetation, other animal species, predator, precipitation, topography, human impact to the habitat, etc.), as well as data of the species (e.g., population, location, diet, sporting history, predator, etc.) to predict the population of the species. The predicted population can be determined based on a population prediction model such as a spatial capture-recapture model, distance sampling techniques, time-series sighting techniques, or any other technique as is known in the art. The population prediction model may receive as inputs the wildlife data and the habitat data and generate, based on the wildlife data and the habitat data, the predicted population. As described further herein, the machine learning classifier may be trained to determine based on historical wildlife data, historical habitat data, and historical sportsman data, one or more machine learning models. The one or more machine learning models may generate, based on the historical wildlife data, historical habitat data, and historical sportsman data, a predicted population (e.g., a number of animals of one or more species). Based on the predicted population, the one or more machine learning models may determine an optimal quantity of sporting licenses to be issued as described further herein.

A quantity of sporting licenses to issue for harvesting (e.g., hunt, fish, etc.) a species can be determined. A sporting license can include any documentation that indicates a person is legally allowed to attempt to harvest and/or harvest a member of the species. The sporting license can include, but is not limited to, a license to harvest one or more members of a species, a harvest tag to harvest one member of a species, and so forth. The harvest tag can be a physical tag configured to be coupled to (e.g., attached to, secured to, etc.) a harvested member of the species in order to "tag" the harvested member as a legal harvest of the species.

The predicted population for the species can be used to determine a quantity of sporting licenses to issue to hunt and/or fish for the species. For example, if the predicted population indicates that the species will be abundant (e.g., the population is predicted to significantly increase as compared to a current population of the species), additional sporting licenses can be issued to increase revenue, while ensuring the population of the species continues to increase. Conversely, if the predicted population indicates that the species will be significantly less than the current population, the quantity of sporting licenses may be reduced significantly, even down to zero sporting licenses being issued to ensure the survival of the species. Thus, the one or more characteristics for each of the sections of the zones 102, 104 can be utilized to determine a predicted population and/or health of a species, which in turn can be utilized to determine a quantity of hunting licenses to be issued. That is to say, across the time domain, the number of sporting licenses to be issued may be determined based on the wildlife data and/or the habitat data such that the number of sporting licenses to be issued is related to the predicted population. Based on the predicted population, the one or more machine learning models may determine an optimal quantity of sporting licenses to be issued as described further herein.

Figure 2:
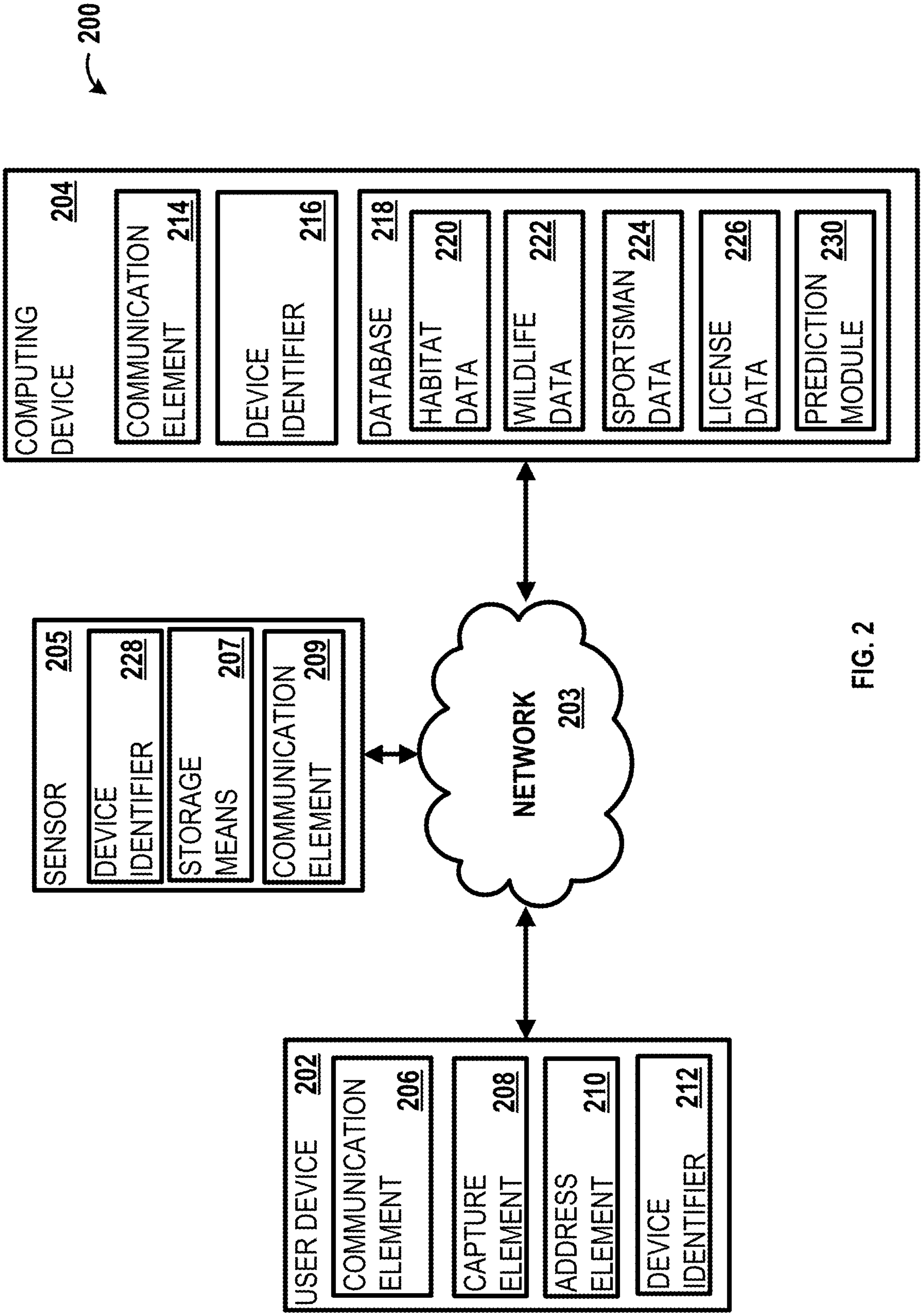
FIG. 2 is a diagram illustrating an exemplary system.

FIG. 2 shows an example of a system 200. Specifically, the system 200 may comprise a user device 202, a computing device 204, and a sensor 205. The user device 202 may comprise a communication element 206, a capture element 208, an address element 210, and a device identifier 212. The user device 202 can be an electronic device such as a computer, a smartphone, a laptop, a tablet, or any other device. The communication element 206 can be a wireless transceiver configured to transmit and receive wireless communications via the communication element 206. The communication element 206 can be configured to communicate via a specific network protocol. The communication element

206 can be a wireless transceiver configured to communicate via a Bluetooth protocol, a Wi-Fi network, a cellular network, a satellite network, combinations thereof, and the like. The user device 202 may be configured to communicate with the computing device 204 and the sensor 205 via the communication element 206.

The capture element 208 can be any component, module, and/or element that facilitates the capturing of data. For example, the capture element 208 can be a still camera, a video camera, a microphone, motion sensor, pressure sensor, RFID antennae, combinations thereof, and the like. As another example, the capture element 208 can be an input device such that a user can interact with the input device. As an example, the capture element 208 can be a touchscreen of a computing device (e.g., smartphone, tablet, computer, etc.) or an input device (e.g., a keyboard, touchpad, mouse, etc.) that the user can interact with. For example, the user may record or enter data, transmit data, receive data, or manipulate device components via the capture element 208. The capture element 208 can be utilized to capture and/or record data relating to the one or more characteristics (e.g., the wildlife data and/or the habitat data) of the zones (e.g., zones 102, 104 of FIG. 1) or species. The user device 202 can provide the captured data to the computing device 204. For example, the user device 202 can send the data (e.g., utilizing the communication element 206) via a network 203 to the computing device 204. The network 203 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The user device 202 can have an address element 210. The address element 210 can comprise or provide an internet protocol address, a network address, a media access control (MAC) address, an Internet address, or the like. The address element 210 can be used to establish a communication session between the user device 202 and the computing device 204 and/or the sensor 205, or other devices and/or networks. The address element 210 can be used as an identifier or locator of the user device 202. The address element 210 can be persistent for a particular network.

The user device 202 can be associated with a user identifier or device identifier 212. The device identifier 212 can be any identifier, token, character, string, or the like, for differentiating one user or user device (e.g., the user device 202) from another user or computing device. The device identifier 212 can identify a user or computing device as belonging to a particular class of users or computing devices. The device identifier 212 can comprise information relating to the user device 202 such as a manufacturer, a model or type of device, a service provider associated with the user device 202, a state of the user device 202, a locator, and/or a label or classifier. Other information can be represented by the device identifier 212. The device identifier 212 can be assigned to the user device 202 by the computing device 204.

The sensor 205 can be any sensor configured to capture data. For example, the sensor 205 may comprise any of the one or more sensors described above, combinations thereof, and the like. The sensor 205 can be a computing device configured to record data (e.g., the wildlife data and/or the habitat data). For example, the sensor 205 may configured to capture and record data that indicates one or more characteristics associated with a habitat, an animal, or a combination of both. The sensor 205 can be configured to capture data related to animals, vegetation, climate (e.g., precipitation, days of sunlight, temperature), human impact, location, and so forth. The sensor 205 can be configured to automatically provide the captured data to the user device 202 and/or the computing device 204 via the network 203. For example, the sensor 205 can be a precipitation sensor that automatically determines an amount of precipitation where the sensor 205 is located. The sensor 205 may comprise a storage module 207. For example, the storage module 207 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. As another example, the sensor 205 can be associated with one or more animals of a species. As an example, the sensor 205 can be a Global Positioning System (GPS) tracking device that is coupled with the one or more animals.

The sensor 205 may comprise a communication element 209. The communication element 209 can be a wireless transceiver configured to transmit and receive wireless communications. The communication element 209 can be configured to communicate via a specific network protocol. The communication element 209 can be a wireless transceiver configured to communicate via a Wi-Fi network, a cellular network, a satellite network, and so forth. The sensor 205 may be configured to communicate with the user device 202 and the computing device 204 via the communication element 209.

The sensor 205 can be associated with a user identifier or device identifier 228. The device identifier 228 can be any identifier, token, character, string, or the like, for differentiating one computing device or sensor (e.g., the sensor 205) from another user or computing device. The device identifier 228 can identify a sensor or computing device as belonging to a particular class of sensors or computing devices. The device identifier 228 can comprise information relating to the sensor 205 such as a manufacturer, a model or type of device, a service provider associated with the sensor 205, a state of the sensor 205, a locator, and/or a label or classifier. Other information can be represented by the device identifier 228. The device identifier 228 can be assigned to the sensor 205 by the user device 202 and/or the computing device 204.

The computing device 204 can comprise a communication element 214, a device identifier 216, and a database 218. The computing device 204 can be an electronic device such as a computer, a server, a cloud computing service, a smartphone, a laptop, a tablet, or any other device. The communication element 214 can be a wireless transceiver configured to transmit and receive wireless communications. The communication element 214 can be configured to communicate via a specific network protocol. The communication element 214 can be a wireless transceiver configured to communicate via a Wi-Fi network, a cellular network, a satellite network, and so forth. The computing device 204 may be configured to communicate with the user device 202 and the sensor 205 via the communication element 214.

The computing device 204 can be associated with a user identifier or device identifier 216. The device identifier 216 can be any identifier, token, character, string, or the like, for differentiating one user or computing device (e.g., the computing device 204) from another user or computing device. The device identifier 216 can identify a user or computing device as belonging to a particular class of users or computing devices. The device identifier 216 can comprise information relating to the computing device 204 such as a manufacturer, a model or type of device, a service provider associated with the computing device 204, a state of the computing device 204, a locator, and/or a label or classifier. Other information can be represented by the device identifier 216.

The computing device 204 can comprise a database 218. The computing device 204 can manage the communication between the user device 202 and the database 218 for sending and receiving data there between. The database 218 can store a plurality of files (e.g., data such as the wildlife data and/or the habitat data), user identifiers or records, or other information. Specifically, the database 218 can store habitat data 220, wildlife data 222, sportsman data 224, and license data 226. The user device 202 can send and/or retrieve files from the database 218. For example, the user device 202 can send the data captured (e.g., by the capture element 208) to the database 218 for storing and processing. Any information may be stored in and received from the database 218. The database 218 may be disposed remotely from the computing device 204 and accessed via direct or indirect connection. The database 218 may be integrated with the computing device 204 or some other device or system. Likewise, as described above with reference to the one or more sensors, the database 218 may store historical versions of the aforementioned data. The historical versions of the aforementioned data (e.g., historical wildlife data, historical habitat data, and historical sportsman data) may be used to train the machine learning model as described further herein.

The habitat data 220 can comprise any data related to a habitat. For example, the habitat data 220 can comprise a plurality of habitat profiles each associated with a habitat and/or an animal species. The habitat can be any habitat such a section and/or a zone, or the habitat can be associated with a specific species. The habitat data 220 can comprise vegetation data, animal species data, predator data, prey data, precipitation data, topography data, human impact data, and so forth. The computing device 204 can be configured to utilize the habitat data 220. For example, the computing device 204 can utilize the habitat data 220 to determine a population for a species, a predicted population for the species, a sustainable population for the species, and so forth. The computing device 204 can be configured to determine a quantity of sporting licenses to issue for the species based on the habitat data 220.

The wildlife data 222 can comprise any data related to wildlife. For example, the wildlife data 222 can comprise a plurality of wildlife profiles each associated with an animal species and/or a habitat. The wildlife data 222 can be associated with a specific habitat, a zone and/or a section, or a specific species. The wildlife data 222 can comprise species data, population data, habitat data, location data, diet data, predator data, sporting history data (e.g., how many sporting licenses have issued for a species or group of species over time), and so forth. The computing device 204 can be configured to utilize the wildlife data 222. For example, the computing device 204 can utilize the wildlife data 222 to determine a population for a species, a predicted population for the species, a sustainable population for the species, and so forth. The computing device 204 can be configured to determine a quantity of sporting licenses to issue for the species based on the wildlife data 222.

The sportsman data 224 can comprise any data related to a sportsman. For example, the sportsman data 224 can comprise a plurality of sportsman profiles each associated with a specific sportsman. The sportsman data 224 can comprise demographic data, license history data, sporting history data (e.g., how many and what type of sporting license purchased each year and whether or not animals were actually harvested), conservation efforts data, donation data, miscellaneous data, and so forth. The computing device 204 can be configured to utilize the sportsman data 224. For example, the computing device 204 can utilize the sportsman data 224 to determine the sportsman to which a sporting license is to be assigned. As an example, the computing device 204 can determine a prioritized list (e.g., order) of sportsman that have a higher chance of being issued a sporting license based on the sportsman data. The prioritized list can be determined based on the license history data, the sporting history data, the conservation efforts data, and/or the donations data. The computing device 204 can be configured to utilize the prioritized list when assigning the sporting licenses. The computing device 204 can be configured to assign sporting licenses via a random selection. Examples of the random selection can include, but are not limited to, a drawing, a sweepstake, a raffle, a random number generator, or any method of random selection. As an example, the random selection may be a true random selection such that no sportsman entered in the random selection is guaranteed a chance to be issued a sporting license, as well as no sportsman having a higher likelihood of being selected for the sporting license. However, the prioritized list may increase the chances that a sportsman is issued a sporting license. The term list can include any data structure with an order or without an order. The order can be based on any characteristic or factor.

The license data 226 can comprise any data associated with the issuance of sporting licenses. The license data 226 can store data that indicates the issuance of sporting licenses for all species of huntable and/or fishable animals for a given state. The license data 226 can also comprise data that indicates the historical issuance of the licenses. For example, the license data 226 can comprise the quantity of sporting licenses that are issued on a seasonal basis. Additionally, the license data 226 can comprise data that indicates information of a sportsman associated with a particular license, and whether the sportsman fully utilized the license. As an example, a hunter may receive a license but may not successfully hunt for a species associated with the license for one or more factors, such as weather, skill, ability to hunt, degradation in the health of the species, and so forth. The license data 226 can also comprise information on persons that are banned from receiving a sporting license.

The license data 226 can comprise any data associated with issuing one or more sporting licenses. For example, the license data 226 can comprise information associated with a random selection for the sporting licenses. The computing device 204 can receive data that indicates one or more sportsman that register for the random selection. As an example, the user device 202 can be configured for a sportsman to register for the random selection. The sportsman can register for the random selection via an online interface (e.g., a website, a portal, etc.) associated with the computing device 204. The computing device 204 can process the random selection in a prioritized manner or a non-prioritized manner. In the non-prioritized manner, the sporting licenses are issued randomly with every sportsman having an equal chance of being issued a sporting license. In the prioritized manner, the sportsman can increase their likelihood of being issued a sporting license by taking one or more actions. As an example, the sportsman can increase their likelihood of being issued a sporting license by contributing to conservation efforts, making monetary or non-monetary donations, regularly applying for sporting licenses, passing on a season, or any action (e.g., a legal action, an action in regulation, etc.) that may be considered beneficial to an entity behind the random selection (e.g., a wildlife agency).

The computing device 204 may comprise a prediction module 230. The prediction module 230 can be configured to utilize the data within the database 218 (e.g., the habitat data 220, the wildlife data 222, the sportsman data 224, and/or the license data 226) to determine a health for a particular species. For example, the computing device 204 can be configured to determine a predicted population for the species based on the data stored within the database 218. The computing device 204 can be configured to determine a quantity of sporting licenses (e.g., fishing licenses, hunting licenses, etc.) based on the predicted population for the species. As an example, the computing device can determine that for a particular species the population will grow from a current population of 300 to a predicted population of 500 within one year. Based on the significant increase in the population, the computing device 204 can be configured to increase the number of sporting licenses issued to hunt and/or fish for the particular species to reduce the predicted population. As another example, the computing device 204 can determine a sustainable population (e.g., a carrying capacity) for the species based on the data stored in the database 218. Returning to the above example of the predicted population being 500 within one year, the sustainable population for the species may only be 400 due to one or more factors. The computing device 204 can be configured to determine the quantity of sporting licenses based on the sustainable population for the species. Thus, the computing device 204 can determine that 100 licenses should be issued to hunt and/or fish the species to reduce the predicted population down to the sustainable population. Additionally, the computing device 204 can be configured to calculate the impact that the issuance of each license (e.g., the removing by hunting and/or fishing of one member of the species) on the predicted population. Again, returning to the above example, with the current population being 300, the computing device 204 can determine based on the data within the database 218 that if 50 of the species are hunted and/or fished, the predicted population will drop from the predicted population of 500 to the sustainable population of 400. Thus, the computing device 204 can be configured to take into account one or more factors based on the data stored within the database 218 to determine the quantity of sporting licenses to issue for a particular species.

Figure 3:
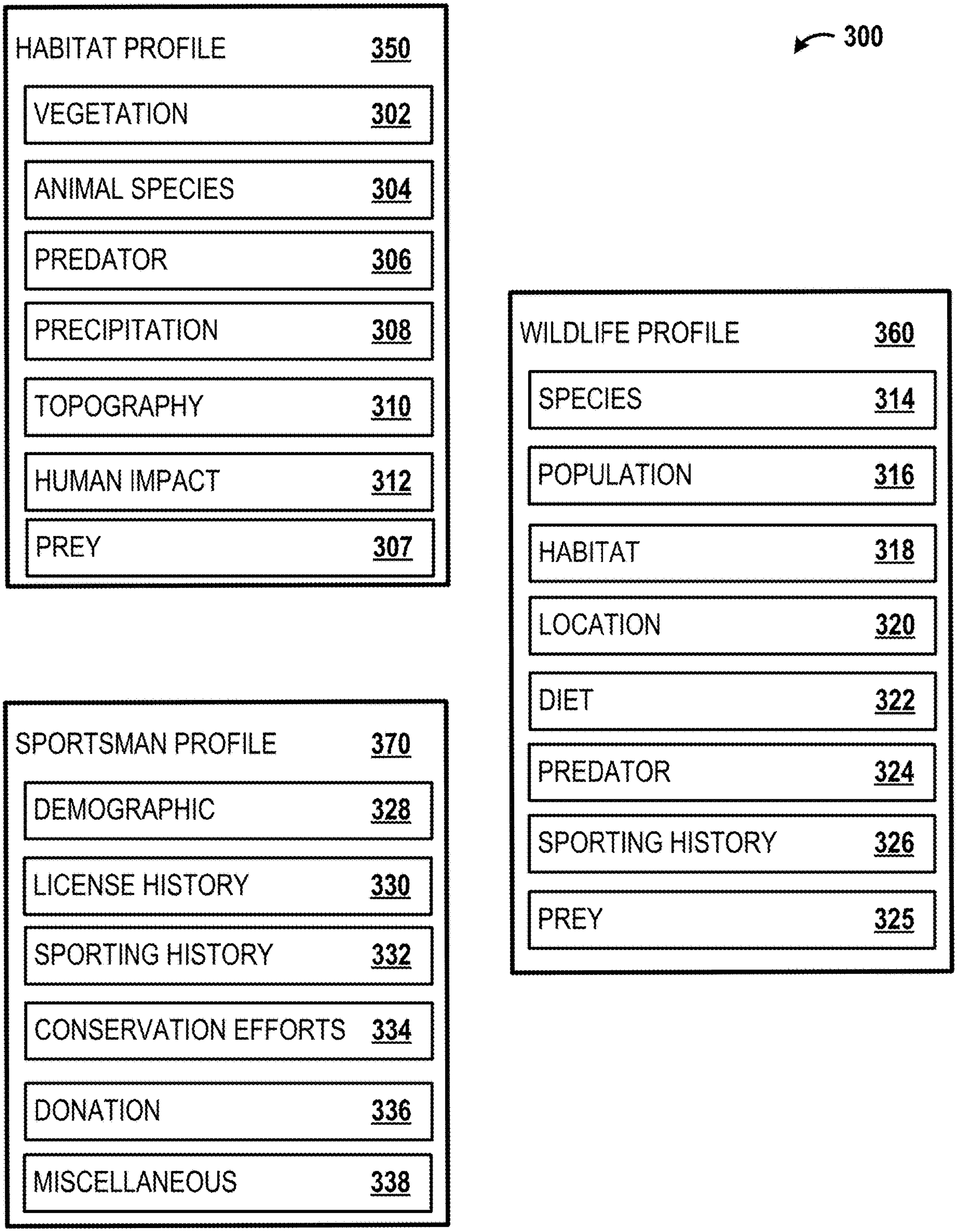
FIG. 3 is a diagram illustrating exemplary data structures.

FIG. 3 shows an example of exemplary data structures 300. The data structures 300 can be stored within a database (e.g., the database 218 of FIG. 2). Specifically, the data structures 300 may comprise a habitat profile 350, a wildlife profile 360, and a sportsman profile 370. While sportsman is used for ease of explanation, the term sportsman is not gender and/or age specific. Thus, the term sportsman comprises all ages and sexes, and should not be construed as only pertaining to males, persons of a particular age, etc.

Each of the sections and/or the zones of FIG. 1 can have an associated habitat profile 350 and/or wildlife profile 360. For example, the habitat profile 350 and the wildlife profile 360 can comprise data that fully describes the habitat and wildlife associated with each of the sections and/or the zones of FIG. 1. As another example, each species can have an associated habitat profile 350 and/or wildlife profile 360 that comprise all the data for a given species. Thus, the data structures 300 can be utilized to store the data utilized by a computing device (e.g., the computing device 204 of FIG. 2) to determine a current population for a species, a predicted population for a species, a sustainable population for a species, a quantity of sporting licenses to issue, combinations thereof, and the like.

The habitat profile 350 can comprise data that describes a habitat. One or more habitat profiles 350 can comprise data that describes the habitat of one or more sections, one or more zones, and/or one or more species. The habitat may be based on a section, a zone, a species, a state, a county, climate, elevation, or any factors and/or characteristics associated with a habitat. For example, the habitat profile 350 can be associated with a specific zone and/or section of the zone. The habitat profile 350 comprises data related to vegetation data 302, animal species data 304, predator data 306, precipitation data 308, topography data 310, and human impact data 312.

The vegetation data 302 can comprise data associated with the vegetation for the habitat profile 350. The vegetation data 302 can comprise one or more characteristics for each of a plurality of vegetation associated with the habitat profile 350. For example, the vegetation data 302 can comprise all the data regarding types of vegetation, species of vegetation, a quantity of vegetation, species which consume the vegetation, combinations thereof, and the like. A computing device can be configured to utilize the vegetation data 302 to determine predicted populations for one or more species based on the vegetation data. As an example, the computing device can be configured to determine a predicted and/or a sustainable population for a species of herbivores based on the amount of vegetation 302 that is found within a specific zone and/or section of a zone. As another example, the computing device can be figured to determine a predicted and/or sustainable population for a species of predator that eat the herbivores that consume the vegetation 302.

The animal species data 304 can comprise data associated with the animal species for the habitat profile 350. The animal species data 304 can comprise one or more characteristics for each of a plurality of animal species associated with the habitat profile 350. For example, the animal species data 304 can comprise all animal species associated with a specific zone and/or section of the zone. The animal species data 304 can comprise huntable and fishable species, as well as non-huntable and non-fishable species. The animal species data 304 may comprise data associated with relationships between species. For example, the animal species data may include data indicating a predator-prey relationship between, for example mountain lions and pronghorns. Thus, the computing device 204 may determine that as the population of a predator species increases, the population of an associated prey species may decrease and therefore impact the quantity of sporting licenses to be issued for a particular species. The computing device can be configured to utilize the animal species data 304 to determine a current population for a species, a predicted population for a species, and/or a sustainable population for a species.

The predator data 306 can comprise data associated with all the predator for the habitat profile 350. The predator data 306 can comprise one or more characteristics for each of a plurality of predator associated with the habitat profile 350. The computing device can be configured to utilize the predator data 306 to determine a current population for a species, a predicted population for a species, and/or a sustainable population for a species.

The habitat profile 350 can also comprise precipitation data 308 that indicates the amount of precipitation for the habitat associated with the habitat profile 350. The precipitation data 308 can comprise historical precipitation data, projected precipitation data, current precipitation data, any natural disaster data even if not specifically precipitation related, and so forth. The habitat profile 350 also comprises topography data 310 that indicates the topography for the habitat associated with the habitat profile 350. The topography data 310 can comprise one or more characteristics associated with the topography such as elevation, rivers, mountains, hills, deserts, and so forth. Further, the habitat profile 350 may comprise human impact data 312 that indicates the human impact for the habitat associated with the habitat profile 350. For example, the human impact data 312 can comprise data such as construction, zoning and planning, habitat destruction, man-made disasters (e.g., fires), natural disasters, and so forth. The computing device can be configured to utilize the precipitation data 308, the topography data 310, and the human impact data 312 to determine a current population for a species, a sustainable population for the species, a predicted population for the species, and/or a quantity of sporting licenses to issue.

The wildlife profile 360 can comprise any information that describes wildlife. For example, one or more wildlife profiles 360 can comprise information associated with one or more species and/or habitats. The wildlife profile 360 may be based on a section, a zone, a species, a state, a county, climate, elevation, or any factors and/or characteristics associated with a habitat. The wildlife profile 360 may comprise species data 314, population data 316, habitat data 318, location data 320, diet data 322, predator data 324, prey data 325, and sporting history 326. For example, the wildlife profile 360 can be associated with a specific species. The species data 314 can indicate the specific species.

The population data 316 can indicate the population of a species associated with the wildlife profile 360. The population data 316 can indicate a current population of the species, a predicted population of the species, a sustainable population of the species, and so forth. The population data 316 can also indicate detailed statistics on the population 316 of a species such as detailed demographics on the species comprising age, sex, reproductive capability, packs (or other groups of animals e.g., herds), combinations thereof, and the like. The population data 316 can be utilized by the computing device to determine the current population for the species, the predicted population for the species, and/or the sustainable population for the species.

The habitat data 318 can comprise data related to the habitat of a species associated with the wildlife profile 360. For example, the habitat data 318 can comprise all the data of the habitat profile 350. The habitat data 318 may be directed toward a specific species. The wildlife profile 360 can also comprise location data 320. The location data 320 can indicate a current location, a predicated location, a past location, etc., for one or more members of the species. For example, the location data 320 can comprise migratory information associated with a species. The habitat data 318 and the location data 320 can be utilized by the computing device to determine locations where the species will be to determine what zones and/or sections should be issued sporting licenses for the species.

The diet data 322 can comprise data related to the diet of a species associated with the wildlife profile 360. For example, the diet data 322 can comprise the vegetation data 302 for an herbivore species. As another example, the diet data 322 can comprise other species (e.g., prey) that the species consumes. The diet data 322 can be utilized by the computing device to determine population data for the species based on the availability of the diet data 322 for the species to consume.

The sporting history 326 can comprise data related to the issuance of sporting licenses to hunt and/or fish for a species associated with the wildlife profile 360. For example, the sporting history 326 can comprise historical data associated with the issuance of sporting licenses, as well as a quantity of the species that have been legally fished and/or hunted, including illegally poached. The sporting history data 326 can be utilized by the computing device to determine impacts to the population of the species based on the quantity of sporting licenses that were issued for the species.

The sportsman profile 370 can comprise data associated with one or more sportsman. One or more sportsman profiles 370 can comprise data on one or more sportsman. The sportsman profile 370 can comprise demographic data 328, license history data 330, sporting history data 332, conservation efforts data 334, donation data 336, and miscellaneous data 338.

The demographic data 328 can comprise any data that indicates one or more characteristics of a sportsman. The demographic data 328 can comprise age, sex, height, address, residency, and so forth. The license history data 330 can comprise data related to the issuance of sporting licenses to the sportsman. For example, the license history data 330 can comprise information indicating seasons the sportsman has received licenses for, species the sportsman has received licenses for, licenses the sportsman has previously passed on, and so forth. The sportsman profile 370 can also comprise sporting history 332. The sporting history data 332 can comprise any data related to the sportsman's past sporting endeavors. For example, the sporting history data 332 can comprise successful sporting licenses (e.g., successfully fished and/or hunted for the species). The sporting history data 332 can also comprise data related to any illegal sporting exploits associated with the sportsman such as improper number of species taken, improper species taken, species taken out of season, and so forth.

The conservation efforts data 334 can comprise any data that indicates the conservation efforts taken by the sportsman associated with the sportsman profile 370. For example, the conservation efforts data 334 can comprise data associated with one or more actions the sportsman has taken to help facilitate the conservation of one or more species. Additionally, the sportsman profile 370 comprises donation data 336. The donation data 336 can comprise any data that indicates donations made by the sportsman. For example, the donation data 336 can comprise data related to any monetary or non-monetary donation made by a sportsman. Further, the sportsman profile 370 comprises miscellaneous data 338, which can comprise any characteristic or data associated with the sportsman, an item associated with the sportsman (e.g., boat, truck, hunting item, fishing item, etc.), any know associates with the sportsman, combinations thereof, and the like.

Figure 4:
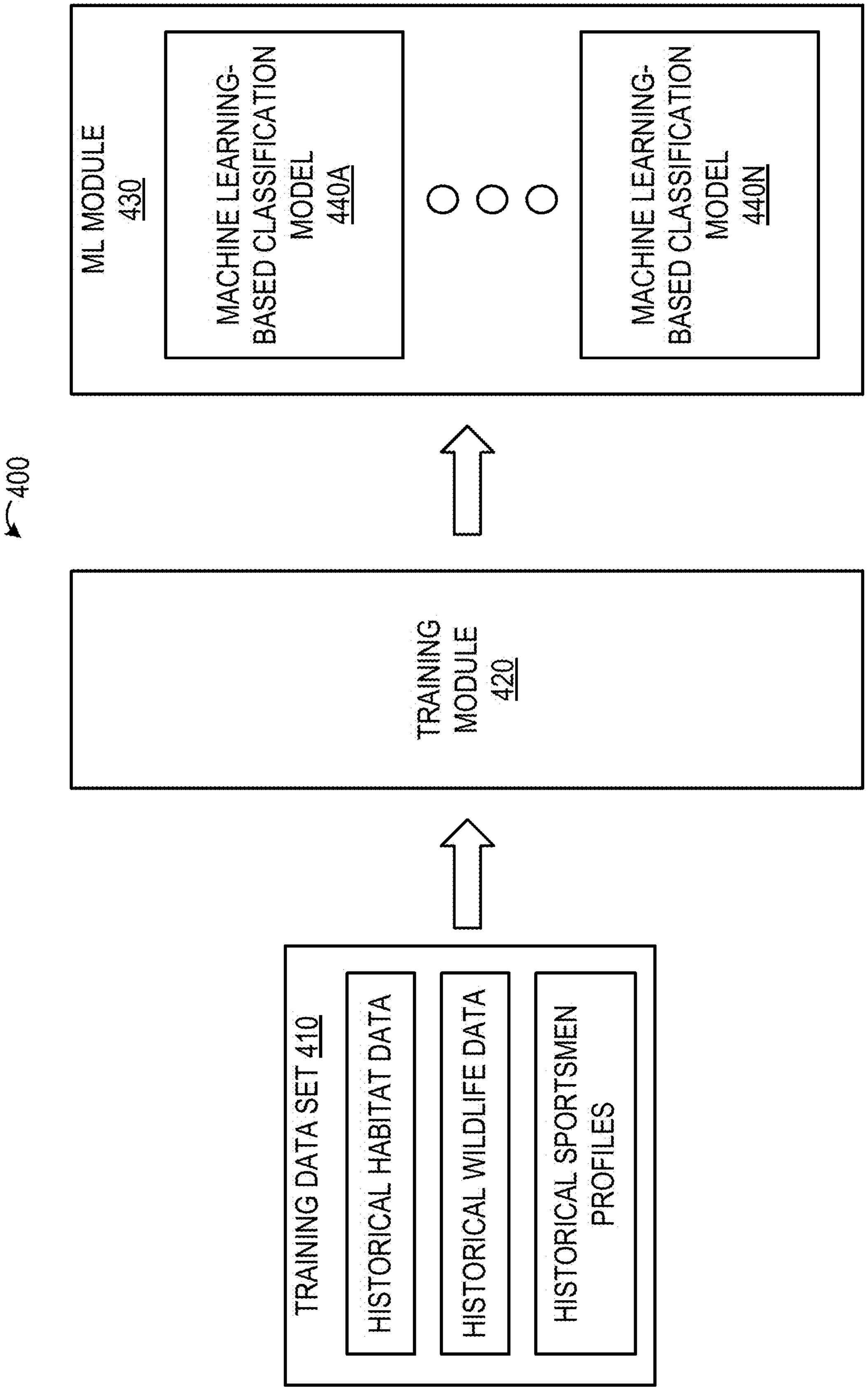
FIG. 4 is a flowchart of an example method.

Turning now to FIG. 4, methods are described for generating a predictive model (e.g., a model to predict a population and/or an optimal quantity of sporting licenses to be issued). The methods described may use machine learning ("ML") techniques to train, based on an analysis of one or more training data sets 410 by a training module 420, at least one ML module 430 that is configured to predict a population (e.g., a species population) for a given zone (e.g., the first zone 102 and/or the second zone 104) of the plurality of zones and predict an optimal quantity of sporting licenses to be issued so as to conserve a species population without exceeding a carrying capacity.

The training data set 410 may comprise one or more of historical habitat data (e.g., historical vegetation data, historical animal species data, historical predator data, history prey data, historical precipitation data, historical topography data, historical human impact data, combinations thereof, and the like), historical wildlife data (e.g., historical species data, historical population data, historical habitat data, historical location data, historical diet data, historical predator data, historical prey data, historical sporting history data, combinations thereof, and the like), and historical sportsman profiles (e.g., historical demographic data, historical license history data, historical sporting history data, historical conservation efforts data, historical donation data, historical miscellaneous data, combinations thereof and the like). Such data may be derived in whole or in part from data as, for example recorded by the one or more sensors (e.g., the sensor 205) or input by a user via the user device 202 as described herein.

A subset of the historical habitat data, historical wildlife data and historical sportsman data may be randomly assigned to the training data set 410 or to a testing data set. In some implementations, the assignment of data to a training data set or a testing data set may not be completely random. In this case, one or more criteria may be used during the assignment. In general, any suitable method may be used to assign the data to the training or testing data sets, while ensuring that the distributions of yes and no labels are somewhat similar in the training data set and the testing data set.

The training module 420 may train the ML module 430 by extracting a feature set from a plurality of years in which animal populations were conserved, did not exceed carrying capacity and optimized revenues (e.g., the quantity of sporting licenses issued that year was an optimal quantity are labeled as yes) and/or a plurality of years in which animal populations and agency revenues were not optimized (e.g., the quantity of sporting licenses issued that year was not an optimal quantity are labeled as no) in the training data set 410 according to one or more feature selection techniques. The training module 420 may train the ML module 430 by extracting a feature set from the training data set 410 that includes statistically significant features of positive examples (e.g., labeled as being yes) and statistically significant features of negative examples (e.g., labeled as being no).

The training module 420 may extract a feature set from the training data set 410 in a variety of ways. The training module 420 may perform feature extraction multiple times, each time using a different feature-extraction technique. In an example, the feature sets generated using the different techniques may each be used to generate different machine learning-based classification models 440. For example, the feature set with the highest quality metrics may be selected for use in training. The training module 420 may use the feature set(s) to build one or more machine learning-based classification models 440A-440N that are configured to predict populations and indicate whether a quantity of sporting licenses to be issued (e.g., with an unknown optimal quantity status) is likely or not to optimize wildlife populations and optimize agency resources.

The training data set 410 may be analyzed to determine any dependencies, associations, and/or correlations between features and the yes/no labels in the training data set 410. The identified correlations may have the form of a list of features that are associated with different yes/no labels. The term "feature," as used herein, may refer to any characteristic of an item of data that may be used to determine whether the item of data falls within one or more specific categories.

In an embodiment, a feature selection technique may be used which may comprise one or more feature selection rules. The one or more feature selection rules may comprise a feature occurrence rule. The feature occurrence rule may comprise determining which features in the training data set 410 occur over a threshold number of times and identifying those features that satisfy the threshold as features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training data set 410 to generate a first list of features. A final list of features may be analyzed according to additional feature selection techniques to determine one or more feature groups (e.g., groups of features that may be used to predict optimal quantity status). Any suitable computational technique may be used to identify the feature groups using any feature selection technique such as filter, wrapper, and/or embedded methods. One or more feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., yes/no).

As another example, one or more feature groups may be selected according to a wrapper method. A wrapper method may be configured to use a subset of features and train a machine learning model using the subset of features. Based on the inferences drawn from a previous model, features may be added and/or deleted from the subset. Wrapper methods include, for example, forward feature selection, backward feature elimination, recursive feature elimination, combinations thereof, and the like. As an example, forward feature selection may be used to identify one or more feature groups. Forward feature selection is an iterative method that begins with no feature in the machine learning model. In each iteration, the feature which best improves the model is added until an addition of a new variable does not improve the performance of the machine learning model. As an example, backward elimination may be used to identify one or more feature groups. Backward elimination is an iterative method that begins with all features in the machine learning model. In each iteration, the least significant feature is removed until no improvement is observed on removal of features. Recursive feature elimination may be used to identify one or more feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 420 has generated a feature set(s), the training module 420 may generate a machine learning-based classification model 440 based on the feature set(s). A machine learning-based classification model may refer to a complex mathematical model for data classification that is generated using machine-learning techniques. In one example, the machine learning-based classification model 440 may include a map of support vectors that represent boundary features. By way of example, boundary features may be selected from, and/or represent the highest-ranked features in a feature set.

The training module 420 may use the feature sets determined or extracted from the training data set 410 to build a machine learning-based classification model 440A-440N for each classification category (e.g., yes, no). In some examples, the machine learning-based classification models 440A-440N may be combined into a single machine learning-based classification model 440. Similarly, the ML module 430 may represent a single classifier containing a single or a plurality of machine learning-based classification models 440 and/or multiple classifiers containing a single or a plurality of machine learning-based classification models 440.

The features may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 430 may comprise a decision rule or a mapping for each feature to assign an optimized status to a quantity of sporting licenses to be issued.

In an embodiment, the training module 420 may train the machine learning-based classification models 440 as a convolutional neural network (CNN). The CNN comprises at least one convolutional feature layer and three fully connected layers leading to a final classification layer (softmax). The final classification layer may finally be applied to combine the outputs of the fully connected layers using softmax functions as is known in the art.

The feature(s) and the ML module 430 may be used to predict a population and an optimal quantity of sporting licenses to be issued in the testing data set. In one example, the prediction result for each quantity of sporting licenses to be issued includes a confidence level that corresponds to a likelihood or a probability that the quantity of licenses to be issued will optimize conservation of a species (conserve the population and avoid exceeding carrying capacity). The confidence level may be a value between zero and one, and it may represent a likelihood that the quantity of sporting licenses to be issued corresponds to a yes/no optimal quantity of licenses status. In one example, when there are two statuses (e.g., yes and no), the confidence level may correspond to a value p, which refers to a likelihood that a particular quantity of sporting licenses to be issued belongs to the first status (e.g., yes). In this case, the value 1−p may refer to a likelihood that the particular quantity of sporting licenses to be issued belongs to the second status (e.g., no). In general, multiple confidence levels may be provided for each quantity of sporting licenses to be issued in the testing data set and for each feature when there are more than two statuses. A top performing feature may be determined by comparing the result obtained for each quantity of sporting licenses to be issued with the known yes/no optimal quantity status for a quantity of sporting licenses to be issued. In general, the top performing feature will have results that closely match the known yes/no optimizer statuses. The top performing feature(s) may be used to predict the yes/no optimal status of quantity of sporting licenses to be issued. For example, a historical wildlife data and historical habitat data may be determined/received and a predicted population and quantity of sporting licenses to be issued may be determined. The predicted population and quantity of sporting licenses to be issued may be provided to the ML module 430 which may, based on the top performing feature(s), classify the quantity of sporting licenses to be issued as either an optimal quantity (yes) or not an optimal quantity (no).

Figure 5:
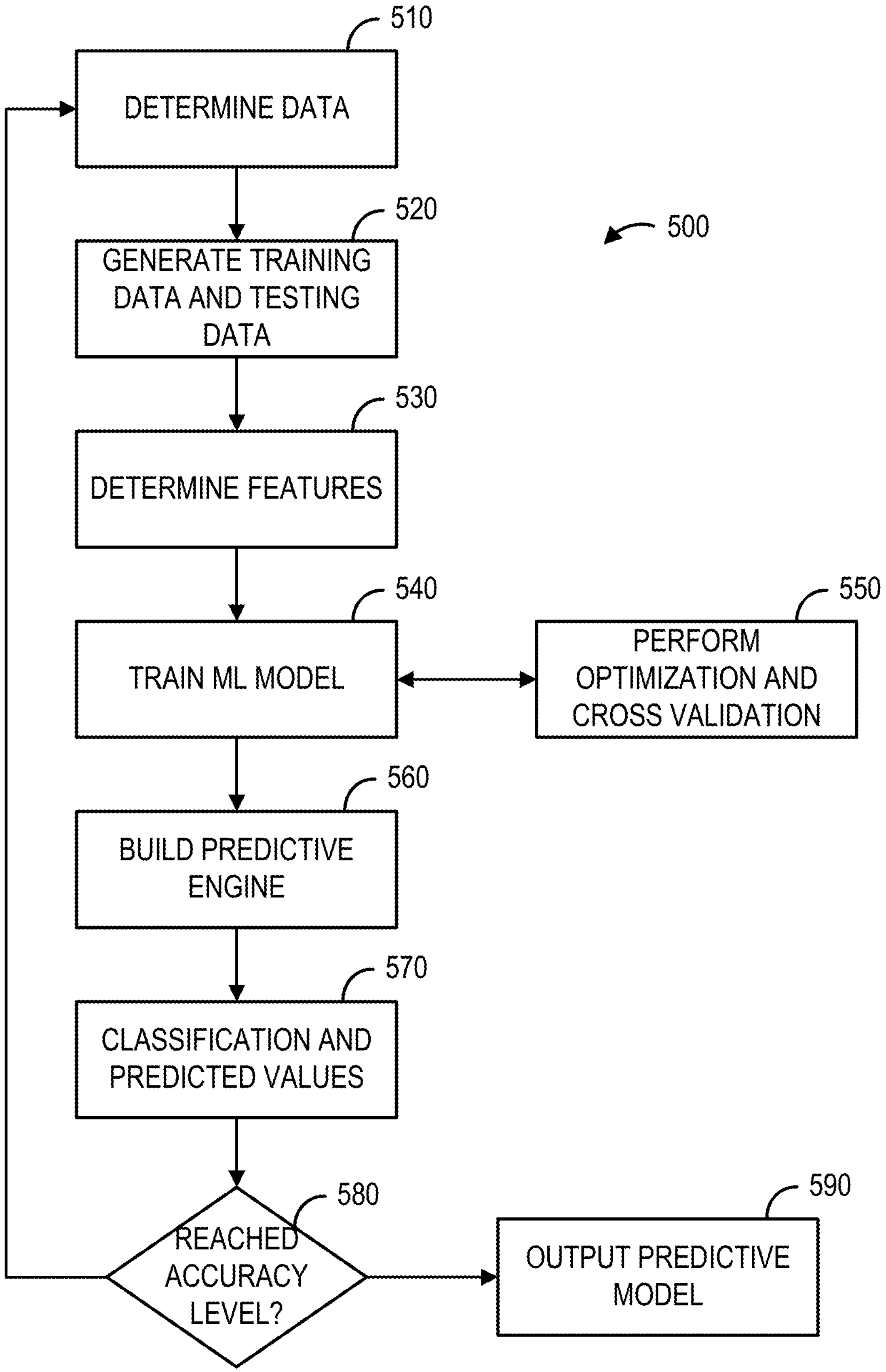
FIG. 5 is a flowchart of an example method.

FIG. 5 is a flowchart illustrating an example training method 500 for generating the ML module 430 using the training module 420. The training module 420 can implement supervised, unsupervised, and/or semi-supervised (e.g., reinforcement based) machine learning-based classification models 440. The method 500 illustrated in FIG. 5 is an example of a supervised learning method; variations of this example of training method are discussed below, however, other training methods can be analogously implemented to train unsupervised and/or semi-supervised machine learning models.

The training method 500 may determine (e.g., access, receive, retrieve, etc.) first historical data at step 510. The historical data may comprise a labeled set of historical habitat data, a labeled set of historical wildlife data, and a labeled set of historical sportsman data. The labels may correspond to population optimizing status (e.g., yes or no).

The training method 500 may generate, at step 520, a training data set and a testing data set. The training data set and the testing data set may be generated by randomly assigning labeled historical data (e.g., the historical habitat data, the historical wildlife data, the historical sportsman data, combinations thereof, and the like) to either the training data set or the testing data set. In some implementations, the assignment of labeled historical data as training or testing data may not be completely random. As an example, a majority of the labeled historical data may be used to generate the training data set. For example, 75% of the labeled historical data may be used to generate the training data set and 25% may be used to generate the testing data set. In another example, 80% of the labeled historical data may be used to generate the training data set and 20% may be used to generate the testing data set.

The training method 500 may determine (e.g., extract, select, etc.), at step 530, one or more features that can be used by, for example, a classifier to differentiate among different classifications of optimal quantity of sporting licenses issued (e.g., yes vs. no). As an example, the training method 500 may determine a set of features from the labeled historical data. In a further example, a set of features may be determined from labeled historical data different than the labeled historical data in either the training data set or the testing data set. In other words, labeled historical data may be used for feature determination, rather than for training a machine learning model. Such labeled historical may be used to determine an initial set of features, which may be further reduced using the training data set. By way of example, the features described herein may comprise one or more of historical habitat data (e.g., historical vegetation data, historical animal species data, historical predator data, history prey data, historical precipitation data, historical topography data, historical human impact data, combinations thereof, and the like) historical wildlife data (e.g., historical species data, historical population data, historical habitat data, historical location data, historical diet data, historical predator data, historical prey data, historical sporting history data, combinations thereof, and the like) or historical sportsman profiles (e.g., historical demographic data, historical license history data, historical sporting history data, historical conservation efforts data, historical donation data, historical miscellaneous data, combinations thereof and the like).

Continuing in FIG. 5, the training method 500 may train one or more machine learning models using the one or more features at step 540. In one example, the machine learning models may be trained using supervised learning. In another example, other machine learning techniques may be employed, including unsupervised learning and semi-supervised. The machine learning models trained at 540 may be selected based on different criteria depending on the problem to be solved and/or data available in the training data set. For example, machine learning classifiers can suffer from different degrees of bias. Accordingly, more than one machine learning model can be trained at 540, optimized, improved, and cross-validated at step 550.

The training method 500 may select one or more machine learning models to build a predictive model at 560. The predictive model may be evaluated using the testing data set. The predictive model may analyze the testing data set and generate predicted optimal statuses at step 570. Predicted optimal statuses may be evaluated at step 580 to determine whether such values have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified a quantity of sporting licenses to be issued as an optimal quantity that was in reality not an optimal quantity. Conversely, the false negatives of the predictive model may refer to a number of times the machine learning model classified a quantity of sporting licenses to be issued as not an optimal quantity when, in fact, the quantity was an optimal quantity. True negatives and true positives may refer to a number of times the predictive model correctly classified one or more quantities of licenses to be issued as an optimal quantity or not an optimal quantity. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 430) may be output at step 590; when the desired accuracy level is not reached, however, then a subsequent iteration of the training method 500 may be performed starting at step 510 with variations such as, for example, considering a larger collection of historical data.

Figure 6:
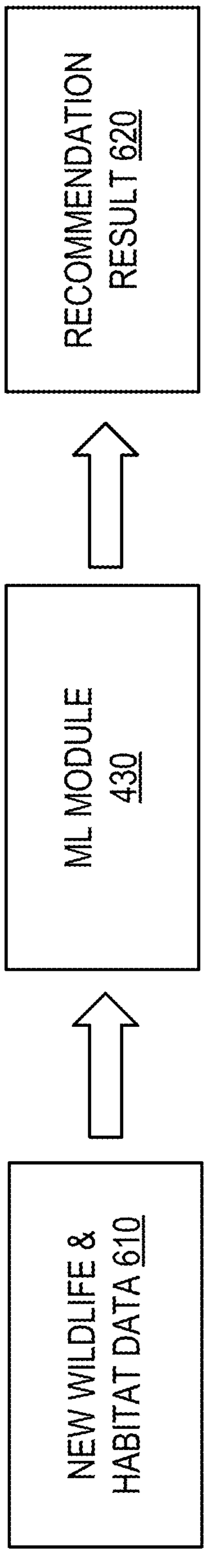
FIG. 6 is a flowchart of an example method.

FIG. 6 is an illustration of an exemplary process flow for using a machine learning-based classifier to determine a predicted population and a recommendation result 620 (e.g., an optimal quantity of sporting licenses to be issued so as to conserve a species population without exceeding a carrying capacity). As illustrated in FIG. 6, new wildlife and habitat data 610 may be provided as input to the ML module 430. For example, the new wildlife habitat data 610 may comprise wildlife data and habitat data from the previous calendar year, the previous six months, the previous hunting or sporting season, combinations thereof, and the like. The ML module 430 may process the new wildlife and habitat data 610 using a machine learning-based classifier(s) to arrive at a predicted population and/or an optimal quantity of sporting licenses to be issued.

The recommendation result 620 may identify one or more characteristics of the new wildlife and habitat data 610. For example, the recommendation result 620 may identify a feature in the new wildlife and habitat data such as a significant event (e.g., drought or forest fire).

The ML module 430 may be used to determine an optimal quantity of sporting licenses to be issued based on the predicted population generated by the machine learning model. For example, the new wildlife and habitat data 610 may indicate that in the previous hunting season, the one or more sensors recorded 100 pronghorn sheep in a given zone (e.g., the first zone 102), the machine learning model may determine that only 10% of the population of pronghorn sheep are likely to be recorded by the one or more sensors (due to a small number of sensors, geographic disparate locations, chance, combinations thereof, and the like, for example) and thus estimate a total population of pronghorn in the first zone 102 during the previous year was 1000 pronghorn. The machine learning model may determine that an average rate of population increase for the pronghorn species year-over-year is 10% and thus the machine learning model may predict the population of pronghorn in the first zone 102 for the upcoming year (e.g., sporting season) is 1100 pronghorn. Further, the new wildlife and habitat data 610 may indicate a drought occurred in the first zone 102. The machine learning model may determine that a drought typically reduces a species count in the first zone 102 by 10% and thus may predict the population of pronghorn in the first zone is 990 pronghorn.

The machine learning model may determine, based on the historical habitat and historical wildlife data 610 that the pronghorn carrying capacity of the first zone 102 is only 800 pronghorn and thus, based on the predicted population, predict that 190 sporting licenses directed towards pronghorn is the optimal quantity of sporting licenses to be issued.

The machine learning model (e.g., the ML module 430) may serve as a quality control mechanism for the machine learning model. Before a quantity of sporting licenses to be issued generated by the machine learning model is tested in an experimental setting, the predictive model may be used to test if the generated quantity of sporting licenses to be issued would be predicted to be optimal for species population optimization.

FIG. 7 shows a flowchart of an example method 700. The method 700 may be implemented by any suitable computing device such as the computing device 204 (e.g., the computing device 801 as described below), the one or more sensors (e.g., the sensor 205), the user device 202 or any other devices described herein. At step 710, a predicted population of a species for a plurality of sections of a zone (e.g., the zones 102, 104 of FIG. 1) can be determined (e.g., by the computing device 204 of FIG. 2). The predicted population of the species can be determined based on habitat data (e.g., the habitat data 220 and/or the wildlife data 222 of FIG. 2; and/or the habitat profile 350 and/or the wildlife profile 360 of FIG. 3). The habitat data can indicate a health of a habitat associated with the species, and the wildlife data can indicate at least one of a current population of the species, a predicted population of the species, and/or a sustainable population of the species. The health of a habitat associated with the species may indicate the habitat's capacity to carry a certain number of animals as determined by the habitat data 220 (e.g., vegetation, precipitation and the like). For example, the computing device 204 may receive the habitat data from the user device 202 and/or the sensor 205. The population module may receive the habitat data as an input and, based on the habitat data, determine the predicted population. The sporting recommendation may impact the predicted population. For example, as sporting licenses are issued and/or as animals are harvested, the predicted population may be updated. For example, a sportsman may harvest a pronghorn and, via user device 202, may send data associated with the harvested pronghorn to the computing device 204. The computing device 204 may receive the data and update the predicted population.

At step 720, a sporting recommendation for each section of the plurality of sections can be determined. For example, the computing device can determine the sporting recommendation for each section of the plurality of sections. The sporting recommendation can be based on the predicted population of the species for each section of the plurality of sections of the zone. The sporting recommendation can indicate that a portion of the predicted population of the species can be consumed (e.g., harvested, fished and/or hunted) for sport within the zone to optimize conservation of the species (e.g., without negatively impacting conservation of the species). Each section of the plurality of sections can be defined based on at least one of a topography of the zone, a natural habitat of the species, landmarks, natural boundaries, or manmade boundaries.

At step 720, a quantity of sporting licenses to be issued can be determined. For example, the computing device can determine the quantity of sporting licenses to be issued. The quantity of sporting licenses to be issued can be based on the sporting recommendation. The quantity of sporting licenses to be issued can also be based on a quantity of sportsmen that applied for a sporting license. As an example, the quantity of sporting licenses to be issued may not be greater than the number of sportsman that applied for the licenses. The sportsman may apply for the licenses during a sporting draw period. The sporting draw period can be a period of time (e.g., one or more days, weeks, months, etc.) when a sportsman applies for a chance to receive a sporting license. The sporting licenses can comprise at least one of a fishing license, a hunting license, or both.

At step 740, a prioritized list of a plurality of sportsmen for issuing the quantity of sporting licenses can be determined. For example, the computing device can determine the prioritized list of the plurality of sportsmen for issuing the quantity of sporting licenses. The prioritized list can be determined based on data associated with the plurality of sportsman. For example, the prioritized list can be determined based on data associated with each sportsman with the plurality of sportsmen (e.g., the sportsman data 224 of FIG. 2 and/or the sportsman profile 370 of FIG. 3). The data associated with each sportsman can indicate at least one of demographic information, previous sporting information, donation information, or conservation information. The prioritized list may be indicate a probability for each sportsman of the plurality of sportsman to receive a sporting license of the quantity of sporting licenses. The prioritized list may comprise one or more priority tiers that are associated with a probability of each sportsman associated with a respective priority tier to be issued a sporting license.

At step 750, the quantity of sporting licenses may be issued. For example, the computing device can issue the quantity of sporting licenses. The quantity of sporting licenses can be issued via a random selection. The quantity of sporting licenses can be issued based on the prioritized list.

Figure 8:
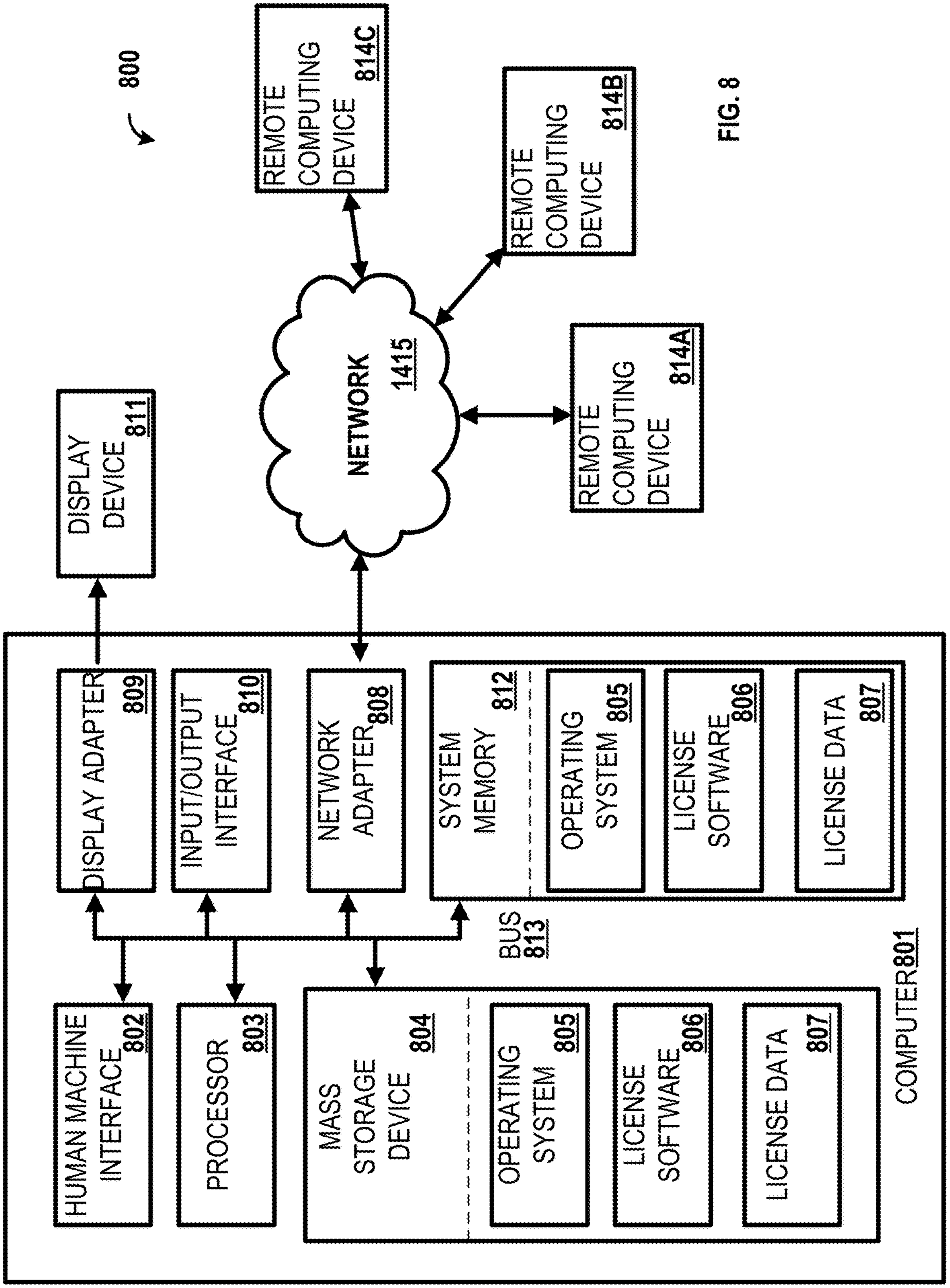
FIG. 8 is a block diagram of an example computing device.

FIG. 8 shows a block diagram 800 of a computing device 801. The user device 202, the computing device 204, and/or the sensor 205 of FIG. 2 can be a computer as shown in FIG. 8. The computer 801 can comprise one or more processors 803, a system memory 812, and a bus 813 that couples various system components including the one or more processors 803 to the system memory 812. In the case of multiple processors 803, the computer 801 can utilize parallel computing.

The bus 813 is one or more of several possible types of bus structures, including a memory bus or memory controller, a peripheral bus, an accelerated graphics port, or local bus using any of a variety of bus architectures.

The computer 801 can operate on and/or comprise a variety of computer readable media (e.g., non-transitory). The readable media can be any available media that is accessible by the computer 801 and can include both volatile and non-volatile media, removable and non-removable media. The system memory 812 can have computer readable media in the form of volatile memory, such as random access memory (RAM), and/or non-volatile memory, such as read only memory (ROM). The system memory 812 can store data such as the license data 807 and/or program modules such as the operating system 805 and the license software 806 that are accessible to and/or are operated on by the one or more processors 803.

The computer 801 can also have other removable/non-removable, volatile/non-volatile computer storage media. FIG. 8 shows the mass storage device 804 which can provide non-volatile storage of computer code, computer readable instructions, data structures, program modules, and other data for the computer 801. The mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 804, such as the operating system 805 and the license software 806. Each of the operating system 805 and the license software 806 (or some combination thereof) can have elements of the program modules and the license recommendation software 806. The license data 807 can also be stored on the mass storage device 804. The license data 807 can be stored in any of one or more databases known in the art. Such databases can be DB2®, Microsoft® Access, Microsoft® SQL Server, Oracle®, MySQL, PostgreSQL, and the like. The databases can be centralized or distributed across locations within the network 818.

A user can enter commands and information into the computer 801 via an input device (not shown). The input device can be, but not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 803 via a human machine interface 802 that can be coupled to the bus 813, but can be connected by other interface and bus structures, such as a parallel port, game port, an IEEE 1394 Port (also known as a Firewire port), a serial port, network adapter 808, and/or a universal serial bus (USB).

The display device 811 can also be connected to the bus 813 via an interface, such as the display adapter 809. It is contemplated that the computer 801 can have more than one display adapter 809 and the computer 801 can have more than one display device 811. The display device 811 can be a monitor, an LCD (Liquid Crystal Display), light emitting diode (LED) display, television, smart lens, smart glass, and/or a projector. In addition to the display device 811, other output peripheral devices can be components such as speakers (not shown) and a printer (not shown) which can be connected to the computer 801 via the Input/Output Interface 810. Any step and/or result of the methods can be output (or caused to be output) in any form to an output device. Such output can be any form of visual representation, including, but not limited to, textual, graphical, animation, audio, tactile, and the like. The display device 811 and computer 801 can be part of one device, or separate devices.

The computer 801 can operate in a networked environment using logical connections to one or more remote computing devices 814A,B,C. A remote computing device can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, an edge device, a content device, a cache device, and so on. The remote computing devices 814A,B,C may be the one or more sensors (e.g., the sensor 208) and/or the user device 202. Logical connections between the computer 801 and a remote computing device 814A,B,C can be made via a network 818, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components reside at various times in different storage components of the computing device 801, and are executed by the one or more processors 803 of the computer. An implementation of the license software 806 can be stored on or sent across some form of computer readable media. Any of the described methods can be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method of using an artificial neural network to improve wildlife management comprising:

receiving, by the artificial neural network, from a plurality of sensors distributed throughout a plurality of sections of a habitat zone, habitat data and wildlife data, wherein the artificial neural network is associated with one or more machine learning models, and wherein at least one first sensor of the plurality of sensors is configured to send the habitat data based on detecting a change in the habitat data that satisfies a first threshold and at least one second sensor of the plurality of sensors is configured to send the wildlife data based on a change in the wildlife data that satisfies a second threshold;

receiving, by the artificial neural network, from a plurality of cameras associated with the plurality of sections of the habitat zone, image data comprising a plurality of images of a species and a plurality of images of a physical area, wherein the plurality of cameras are configured to send the image data based on detecting motion within a field of view of the plurality of cameras and one or more vibrations detected by one or more vibration sensors in communication with the plurality of cameras;

receiving, by the artificial neural network, from the one or more vibration sensors, vibration data;

generating, by a training model of the one or more machine learning models, based on the habitat data, the wildlife data, the image data, the vibration data, and one or more sportsmen profiles, training data configured for training the one or more machine learning models, wherein the one or more machine learning models are configured to determine a predicted population of the species associated with the plurality of sections of the habitat zone;

extracting, by the training model of the one or more machine learning models, one or more sportsmen feature sets from the one or more sportsmen profiles, one or more habitat feature sets from the habitat data, one or more vibration feature sets from the vibration data, and one or more wildlife feature sets from the wildlife data;

combining, by the training model, the one or more habitat feature sets, the one or more wildlife feature sets, the one or more vibration feature sets, and the one or more sportsmen feature sets in a predictive population model;

training, based on the combined feature sets, the predictive population model of the one or more machine learning models using a supervised learning technique, wherein the predictive population model comprises a trained neural network and is configured to predict a population of the species in the plurality of sections of the habitat zone;

determining, by the predictive population model, based on the combined feature sets, the predicted population of the species for each section of the plurality of sections;

determining, by the one or more machine learning models, based on the predicted population of the species for each section of the plurality of sections, a sporting recommendation for the habitat zone, wherein the sporting recommendation indicates a portion of the predicted population of the species that can be consumed for sport within the habitat zone;

determining, by the one or more machine learning models, and based on the sporting recommendation and a predicted hunting license utilization rate, a quantity of hunting licenses to be issued, wherein the predicted hunting license utilization rate is based on historical sportsmen success rates and harvest compliance metrics stored in the one or more sportsmen profiles;

compiling, by the one or more machine learning models, based on the one or more sportsmen profiles, a prioritized list of the one or more sportsmen profiles to be allocated the quantity of hunting licenses, wherein the prioritized list is determined based on at least one of license history data, sporting history data, and conservation history data or donation history data;

issuing, based on the prioritized list, by a computing device in communication with the artificial neural network, the quantity of hunting licenses via one or more printable or digitally distributable license documents;

receiving, by the computing device, post-issuance harvest data from one or more sportsmen of the prioritized list, wherein the post-issuance harvest data indicates whether animals of the species were successfully harvested using the issued quantity of hunting licenses; and retraining, by the training model of the one or more machine learning models, the predictive population model using the post-issuance harvest data to improve a predictive accuracy of the predictive population model for a subsequent issuance of hunting licenses.

2. The method of claim 1, wherein issuing, based on the prioritized list, the quantity of hunting licenses comprises causing paper documentation to be sent to one or more addresses associated with the one or more sportsmen profiles.

3. The method of claim 1, wherein the one or more sportsmen profiles comprise data associated with a respective sportsman of a plurality of sportsmen comprising at least one of demographic information, previous sporting information, donation information, or conservation information.

4. The method of claim 1, wherein the prioritized list of the one or more sportsmen profiles indicates a probability for each sportsman of a plurality of sportsmen to receive a hunting license of the quantity of hunting licenses.

5. The method of claim 1, wherein the prioritized list of the one or more sportsmen profiles comprises one or more priority tiers that are associated with a probability of each sportsman associated with a respective priority tier to be issued a hunting license.

6. The method of claim 1, wherein the habitat data indicates a health of a habitat associated with the species, and wherein the wildlife data indicates one or more of: a current population of the species, the predicted population of the species, and/or a sustainable population of the species.

7. The method of claim 1, wherein each section of the plurality of sections is defined based on at least one of a topography of the habitat zone, a natural habitat of the species, one or more landmarks, one or more natural boundaries, or one or more manmade boundaries.

8. An apparatus, comprising:

one or more processors; and a memory storing processor-executable instructions that, when executed by the one or more processors, cause the apparatus to:

receive, by an artificial neural network, from a plurality of sensors distributed throughout a plurality of sections of a habitat zone, habitat data and wildlife data, wherein the artificial neural network is associated with one or more machine learning models, and wherein at least one first sensor of the plurality of sensors is configured to send the habitat data based on detecting a change in the habitat data that satisfies a first threshold and at least one second sensor of the plurality of sensors is configured to send the wildlife data based on a change in the wildlife data that satisfies a second threshold;

receive, by the artificial neural network, from a plurality of cameras associated with the plurality of sections of the habitat zone, image data comprising a plurality of images of a species and a plurality of images of a physical area, wherein the plurality of cameras are configured to send the image data based on detecting motion within a field of view of the plurality of cameras and one or more vibrations detected by one or more vibration sensors in communication with the plurality of cameras;

receive, by the artificial neural network, from the one or more vibration sensors, vibration data;

generate, by a training model of the one or more machine learning models, based on the habitat data, the wildlife data, the image data, the vibration data, and one or more sportsmen profiles, training data configured for training the one or more machine learning models, wherein the one or more machine learning models are configured to determine a predicted population of the species associated with the plurality of sections of the habitat zone;

extract, by the training model of the one or more machine learning models, one or more sportsmen feature sets from the one or more sportsmen profiles, one or more habitat feature sets from the habitat data, one or more vibration feature sets from the vibration data, and one or more wildlife feature sets from the wildlife data;

combine, by the training model, the one or more habitat feature sets, the one or more wildlife feature sets, the one or more vibration feature sets, and the one or more sportsmen feature sets in a predictive population model;

train, based on the combined feature sets, the predictive population model of the one or more machine learning models using a supervised learning technique, wherein the predictive population model comprises a trained neural network and is configured to predict a population of the species in the plurality of sections of the habitat zone;

determine, by the predictive population model, based on the combined feature set, the predicted population of the species for each section of the plurality of sections;

determine, by the one or more machine learning models, based on the predicted population of the species for each section of the plurality of sections, a sporting recommendation for the habitat zone, wherein the sporting recommendation indicates a portion of the predicted population of the species that can be consumed for sport within the habitat zone;

determine, by the one or more machine learning models, and based on the sporting recommendation and a predicted sporting license utilization rate, a quantity of hunting licenses to be issued, wherein the predicted sporting license utilization rate is based on historical sportsmen success rates and harvest compliance metrics stored in the one or more sportsmen profiles;

compile, by the one or more machine learning models, based on the one or more sportsmen profiles, a prioritized list of the one or more sportsmen profiles to be allocated the quantity of hunting licenses wherein the prioritized list is determined based on at least one of license history data, sporting history data, and conservation history data or donation history data;

issue, based on the prioritized list, by a computing device in communication with the artificial neural network, the quantity of hunting licenses via one or more printable or digitally distributable license documents;

receive, by the computing device, post-issuance harvest data from one or more sportsmen of the prioritized list, wherein the post-issuance harvest data indicates whether animals of the species were successfully harvested using the issued quantity of hunting licenses; and retrain, by the training model of the one or more machine learning models, the predictive population model using the post-issuance harvest data to improve a predictive accuracy of the predictive population model for a subsequent issuance of hunting licenses.

9. The apparatus of claim 8, wherein the processor-executable instructions that, when executed by the one or more processors, cause the apparatus to issue, based on the prioritized list, the quantity of hunting licenses further cause the apparatus to cause paper documentation to be sent to one or more addresses associated with the one or more sportsmen profiles.

10. The apparatus of claim 8, wherein the one or more sportsmen profiles comprise data associated with a respective sportsman of a plurality of sportsmen comprising at least one of demographic information, previous sporting information, donation information, or conservation information.

11. The apparatus of claim 8, wherein the prioritized list of the one or more sportsmen profiles indicates a probability for each sportsman of a plurality of sportsmen to receive a hunting license of the quantity of hunting licenses.

12. The apparatus of claim 8, wherein the prioritized list of the one or more sportsmen profiles comprises one or more priority tiers that are associated with a probability of each sportsman associated with a respective priority tier to be issued a hunting license.

13. The apparatus of claim 8, wherein the habitat data indicates a health of a habitat associated with the species, and wherein the wildlife data indicates one or more of: a current population of the species, the predicted population of the species, and/or a sustainable population of the species.

14. The apparatus of claim 8, wherein each section of the plurality of sections is defined based on at least one of a topography of the habitat zone, a natural habitat of the species, one or more landmarks, one or more natural boundaries, or one or more manmade boundaries.

15. One or more non-transitory computer readable media storing processor-executable instructions that, when executed by at least one processor, cause the at least one processor to:

receive, by an artificial neural network, from a plurality of sensors distributed throughout a plurality of sections of a habitat zone, habitat data and wildlife data, wherein the artificial neural network is associated with one or more machine learning models, and wherein at least one first sensor of the plurality of sensors is configured to send the habitat data based on detecting a change in the habitat data that satisfies a first threshold and at least one second sensor of the plurality of sensors is configured to send the wildlife data based on a change in the wildlife data that satisfies a second threshold;

receive, by the artificial neural network, from a plurality of cameras associated with the plurality of sections of the habitat zone, image data comprising a plurality of images of a species and a plurality of images of a physical area, wherein the plurality of cameras are configured to send the image data based on detecting motion within a field of view of the plurality of cameras and one or more vibrations detected by one or more vibration sensors in communication with the plurality of cameras;

receive, by the artificial neural network, from the one or more vibration sensors, vibration data;

generate, by a training model of the one or more machine learning models, based on the habitat data, the wildlife data, the image data, the vibration data, and one or more sportsmen profiles, training data configured for training the one or more machine learning models, wherein the one or more machine learning models are configured to determine a predicted population of the species associated with the plurality of sections of the habitat zone;

extract, by the training model of the one or more machine learning models, one or more sportsmen feature sets from the one or more sportsmen profiles, one or more habitat feature sets from the habitat data, one or more vibration feature sets from the vibration data, and one or more wildlife feature sets from the wildlife data;

combine, by the training model, the one or more habitat feature sets, the one or more wildlife feature sets, the one or more vibration feature sets, and the one or more sportsmen feature sets in a predictive population model;

train, based on the combined feature sets, the predictive population model of the one or more machine learning models using a supervised learning technique, wherein the predictive population model comprises a trained neural network and is configured to predict a population of the species in the plurality of sections of the habitat zone;

determine, by the predictive population model, based on the combined feature set, the predicted population of the species for each section of the plurality of sections;

determine, by the one or more machine learning models, based on the predicted population of the species for each section of the plurality of sections, a sporting recommendation for the habitat zone, wherein the sporting recommendation indicates a portion of the predicted population of the species that can be consumed for sport within the habitat zone;

determine, by the one or more machine learning models, and based on the sporting recommendation and a predicted hunting license utilization rate, a quantity of hunting licenses to be issued, wherein the predicted hunting license utilization rate is based on historical sportsmen success rates and harvest compliance metrics stored in the one or more sportsmen profiles;

compile, by the one or more machine learning models, based on the one or more sportsmen profiles, a prioritized list of the one or more sportsmen profiles to be allocated the quantity of hunting licenses wherein the prioritized list is determined based on at least one of license history data, sporting history data, and conservation history data or donation history data;

issue, based on the prioritized list, by a computing device in communication with the artificial neural network, the quantity of hunting licenses via one or more printable or digitally distributable license documents;

receive, by the computing device, post-issuance harvest data from one or more sportsmen of the prioritized list, wherein the post-issuance harvest data indicates whether animals of the species were successfully harvested using the issued quantity of hunting licenses; and retrain, by the training model of the one or more machine learning models, the predictive population model using the post-issuance harvest data to improve a predictive accuracy of the predictive population model for a subsequent issuance of hunting licenses.

16. The one or more non-transitory computer readable media of claim 15, wherein the processor-executable instructions that, when executed by the at least one processor, cause the at least one processor to issue, based on the prioritized list, the quantity of hunting licenses further cause the at least one processor to cause paper documentation to be sent to one or more addresses associated with the one or more sportsmen profiles.

17. The one or more non-transitory computer readable media of claim 15, wherein the one or more sportsmen profiles comprise data associated a respective sportsman comprising at least one of demographic information, previous sporting information, donation information, or conservation information.

18. The one or more non-transitory computer readable media of claim 15, wherein the prioritized list of the one or more sportsmen profiles indicates a probability for each sportsman of a plurality of sportsmen to receive a hunting license of the quantity of hunting licenses.

19. The one or more non-transitory computer readable media of claim 15, wherein the prioritized list of the one or more sportsmen profiles comprises one or more priority tiers that are associated with a probability of each sportsman associated with a respective priority tier to be issued a hunting license.

20. The one or more non-transitory computer readable media of claim 15, wherein the processor-executable instructions, when executed by the at least one processor, further cause the at least one processor to determine the habitat data and the wildlife data, wherein the habitat data indicates a health of a habitat associated with the species, and wherein the wildlife data indicates one or more of: a current population of the species, the predicted population of the species, and/or a sustainable population of the species.

21. The one or more non-transitory computer readable media of claim 15, wherein each section of the plurality of sections is defined based on at least one of a topography of the habitat zone, a natural habitat of the species, landmarks, natural boundaries, or manmade boundaries.

* * * * *